Oct. 16, 1934. P. M. SCHLAUCH Re. 19,344

TOOL CENTERING PILOT

Original Filed March 5, 1930

INVENTOR.
PETER M. SCHLAUCH
BY
Parker & Burton
ATTORNEY.

Reissued Oct. 16, 1934

Re. 19,344

UNITED STATES PATENT OFFICE 19,344

TOOL CENTERING PILOT

Peter M. Schlauch, Detroit, Mich.

Original No. 1,796,404, dated March 17, 1931, Serial No. 433,467, March 5, 1930. Refiled for abandoned application Serial No. 119,038, June 28, 1926. Application for reissue February 27, 1933, Serial No. 658,847

5 Claims. (Cl. 90—12.5)

My invention relates to an improved pilot for centering and guiding tools or like devices, as for instance a cutting tool in a boring, reaming, grinding, or other similar operation, and this application is filed to take the place of my former application Serial No. 119,038, filed June 28, 1926, which became abandoned April 27, 1928. My invention is particularly useful in connection with tools such as valve seating tools or tools of a similar character.

My improved pilot is simple in construction; positive and accurate in its centering operation; adaptable for use with out-of-round, eccentric, or inaccurate openings or in openings which are oversize or undersize; and it is automatically adjustable to accommodate itself to a substantially wide range of variation in the size of openings.

A meritorious feature is the provision of such a pilot having a three point bearing in an opening throughout substantially the length of the pilot. My improved construction comprises the minimum number of parts and is of a rugged, durable character.

Other objects and advantages will more fully appear from the following specification, appended claims, and accompanying drawing, in which:

Figure 2:
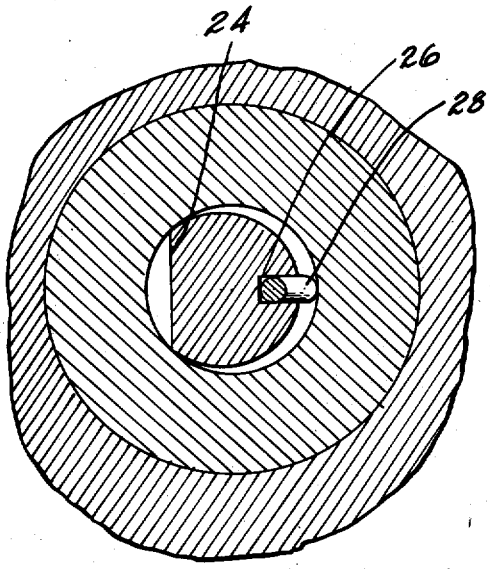
Fig. 2 is a cross-sectional view taken on line 2—2 of Fig. 1.

In various mechanical operations, it becomes necessary to center a tool or other device relative to an opening or surface which is to be rebored, reground or otherwise engaged or worked upon, and it is essential also that the tool be guided therein, in its centered position. This centering of the tool should be accomplished quickly and readily. The pilot which centers the tool should be of simple rugged construction possessing a minimum number of parts so as not to get out of order easily and it should be capable of accurately and positively centering the tool relative to the aperture to be finished. The centering pilot should be of such a character as to be adaptable for operation in apertures of varying size and within openings which are eccentric, out-of-round, or otherwise inaccurate. This adaptability of the centering pilot is made necessary by virtue of the very character of the work to be performed. My pilot construction answers the exacting requirements heretofore enumerated.

The principle of the present invention is substantially that of the V-block commonly employed in tool rooms for accurately determining the center of a circular member. These blocks are provided with a pair of angularly disposed surfaces and accordingly a plane including the line of intersection of such surfaces and bisecting the angle between them must necessarily pass through the axis of a circular object simultaneously contacting both surfaces. The problem solved by the present invention involves accurately locating a member within an approximately cylindrical hole contained in another member, and accordingly one of the members is provided with a pair of fixed angularly spaced lines of contact constantly urged into contact with the surfaces of the other members by resilient means exerting its force in a plane passing between such lines of contact. The two lines of contact serve the same purpose in centering one member with respect to the other as do the angularly disposed walls or surfaces of a V-block, and accordingly the two members are accurately positioned relative to each other.

As illustrative only of one application of the present invention, I show in the accompanying drawing an application applied to a tool for surfacing or resurfacing the valve seat for either an intake or exhaust valve of an internal combustion engine. In such construction it is absolutely essential for proper and noiseless operation of the valve that the seat be absolutely concentric with the opening in the cooperating valve guide and that all parts of the seat be disposed in exactly the same angular relationship with respect to the axis of the opening in the guide. The mechanism shown in the accompanying drawing is capable of producing such a perfect valve seat.

In the drawing, let 10 indicate the head of a cylinder having a valve opening 12 and a guide 14. A tool shank is indicated as 16. This shank has an intermediate tapered tool seat 18 upon which is mounted a suitable cutting tool 20. Obviously this tool shank is adapted to receive tools varying in character and design. The shank is provided with a pilot extension 22 which is here shown as being integral therewith.

Figure 1:
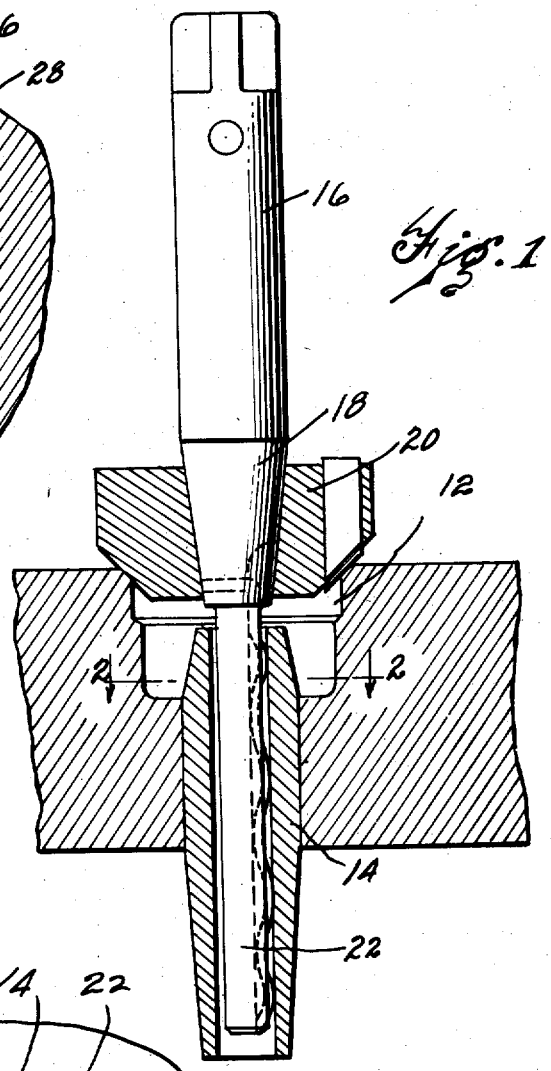
Fig. 1 is a fragmentary sectional view through the head of a cylinder showing my improved pilot in position in elevation therein.
Figure 4:
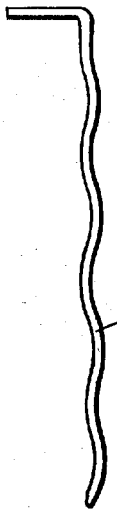
Fig. 4 is a side elevation of the spring member.
Figure 3:
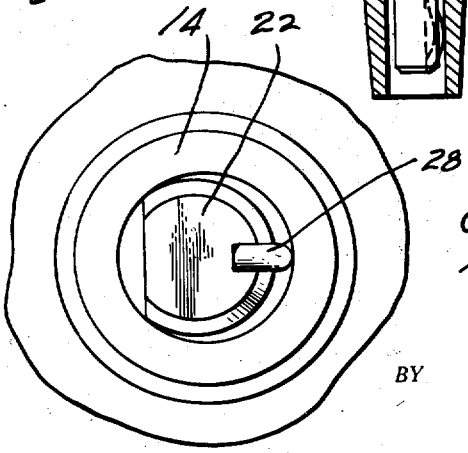
Fig. 3 is an end view of the pilot member.

This pilot extension is of a generally cylindrical form. It has a flatted longitudinal face 24. At a point remote from the flatted face is a channel 26 which extends longitudinally of the pilot. I have shown this channel as disposed on the opposite side of the pilot from the flatted face. Mounted in the channel is a spring member 28. This spring member has an outwardly convex face. It is here shown as being circular in cross section. The spring is corrugated so that certain portions thereof project radially beyond the surface of the pilot and engage the guide wall as shown in Figs. 1 and 2.

In the tool operation the pilot is inserted into the guide opening. The spring yields to permit the insertion of the pilot and centers the same within the opening with a three point bearing against the wall of the opening, the three bearing points being the spring and the two edges of the flatted face. These bearings extend throughout the length of the pilot and hold the same accurately in position. Obviously the pilot is adapted to be received within openings which vary in size throughout a determined range. It is capable of being received within an opening which is undersize or oversize a determined diameter. It is also adapted to be received within an opening which is eccentric, out-of-round, or otherwise inaccurate. It takes the place, therefore, of a multiplicity of pilots of definite fixed size and is automatically adjustable to meet the requirements of the particular tool operation necessary to be performed.

Formal changes may be made in the specific embodiment of the invention described without departing from the spirit or substance of the broad invention, the scope of which is commensurate with the appended claims.

What I claim is:

1. The combination with a tool shank and a tool of an axially positioned pilot extending beyond the tool, said pilot being generally cylindrical in form and having a flatted longitudinally extending face and a longitudinally extending channel positioned on the side opposite the flatted face and a spring extending lengthwise within said channel provided with an outwardly convex bearing portion extending beyond the surface of the pilot.

2. The combination with a tool shank and a tool of a pilot therefor, said pilot disposed axially with respect to the tool and extending therebeyond and being of generally cylindrical shape and provided with a flatted longitudinal face and a longitudinally extending channel remote from the face and a round corrugated spring disposed within said channel having portions extending radially beyond the surface of the pilot.

3. A tool shank having an intermediate part adapted to removably receive a tool and an axial pilot portion extending beyond such intermediate part, said pilot portion having a flatted longitudinal face and a longitudinally extending channel remote from such flatted face and provided with an outwardly convex yielding member situated within the channel and adapted to project outwardly therebeyond.

4. A tool shank having an intermediate tapered tool seat and a pilot extension positioned axially with respect to said seat, said pilot extension having a flat longitudinal face and a longitudinally extending channel positioned on the side opposite the flat face and a linearly extending yielding member situated within said channel having portions normally projecting beyond the surface of the pilot adapted to be resistingly depressed within said channel.

5. A tool pilot comprising a generally cylindrical member having a flattened longitudinal face and a longitudinally extending channel remote from said flattened face and provided with an outwardly convex yielding member situated within the channel and adapted to project outwardly therebeyond.

PETER M. SCHLAUCH.